US012620640B2

(12) United States Patent
Park et al.

(10) Patent No.: US 12,620,640 B2
(45) Date of Patent: May 5, 2026

(54) POUCH CELL VENT PRESSURE MEASUREMENT APPARATUS

(71) Applicants: Hyundai Motor Company, Seoul (KR); Kia Corporation, Seoul (KR)

(72) Inventors: Sang Mok Park, Gyeonggi-do (KR); Dong Guk Park, Incheon (KR); Yong Ju Lim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 890 days.

(21) Appl. No.: 17/873,044

(22) Filed: Jul. 25, 2022

(65) Prior Publication Data

US 2023/0081216 A1 Mar. 16, 2023

(30) Foreign Application Priority Data

Sep. 14, 2021 (KR) ........................ 10-2021-0122615

(51) Int. Cl.
H01M 10/48 (2006.01)
H01M 50/105 (2021.01)

(52) U.S. Cl.
CPC ......... H01M 10/48 (2013.01); H01M 50/105 (2021.01)

(58) Field of Classification Search
CPC ......... H01M 10/00–667; H01M 10/48; H01M 50/105
See application file for complete search history.

(56) References Cited

U.S. PATENT DOCUMENTS

| | | | | |
|---|---|---|---|---|
| 6,635,379 B2 * | 10/2003 | Onishi | .............. | H01M 10/4285 429/49 |
| 9,470,602 B2 * | 10/2016 | Yasooka | ............... | G01M 3/363 |
| 2003/0124416 A1 * | 7/2003 | Kaneta | .............. | H01M 10/0413 429/176 |
| 2004/0134259 A1 * | 7/2004 | Haug | ................ | H01M 10/4228 73/40 |

FOREIGN PATENT DOCUMENTS

| | | | | | |
|---|---|---|---|---|---|
| CN | 215178461 U | * | 12/2021 | | |
| JP | H0845541 A | * | 2/1996 | | |
| JP | 2001033343 A | * | 2/2001 | | |
| KR | 10-2008-0023375 A | | 3/2008 | | |
| KR | 10-2019-0134179 A | | 12/2019 | | |
| KR | 10-2021-0071330 A | | 6/2021 | | |
| KR | 20250040331 A | * | 3/2025 | .......... | H01M 50/105 |

OTHER PUBLICATIONS

Machine translation of KR 2008-0023375 (Year: 2008).*
Office action dated Mar. 11, 2026 for corresponding Korean Patent Application No. 10-2021-0122615.

* cited by examiner

*Primary Examiner* — Judy Nguyen
*Assistant Examiner* — James Split
(74) *Attorney, Agent, or Firm* — Fox Rothschild LLP

(57) ABSTRACT

An apparatus for measuring a vent pressure of a pouch cell includes a pouch cell accommodating an electrode assembly therein, and formed with a heat fusion part on a side thereof; a measurement unit defining therein a space for seating the pouch cell, expanding the pouch cell by a negative pressure formed in the measuring unit, and measuring a vent pressure of the pouch cell; and a negative pressure forming unit connected to the measurement unit, and forming a negative pressure inside the measurement unit.

9 Claims, 2 Drawing Sheets

[FIG. 1]
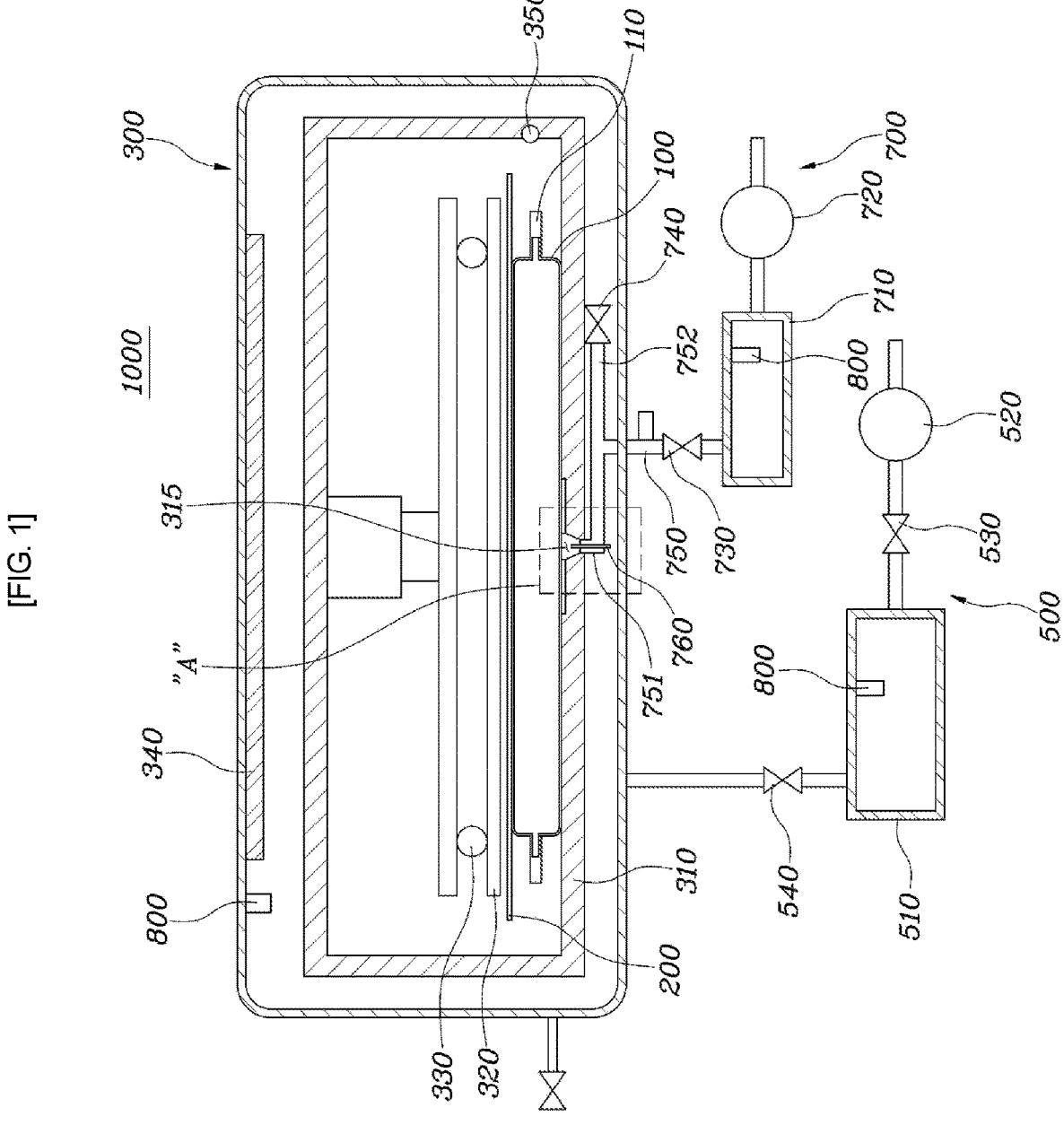

[FIG. 2]
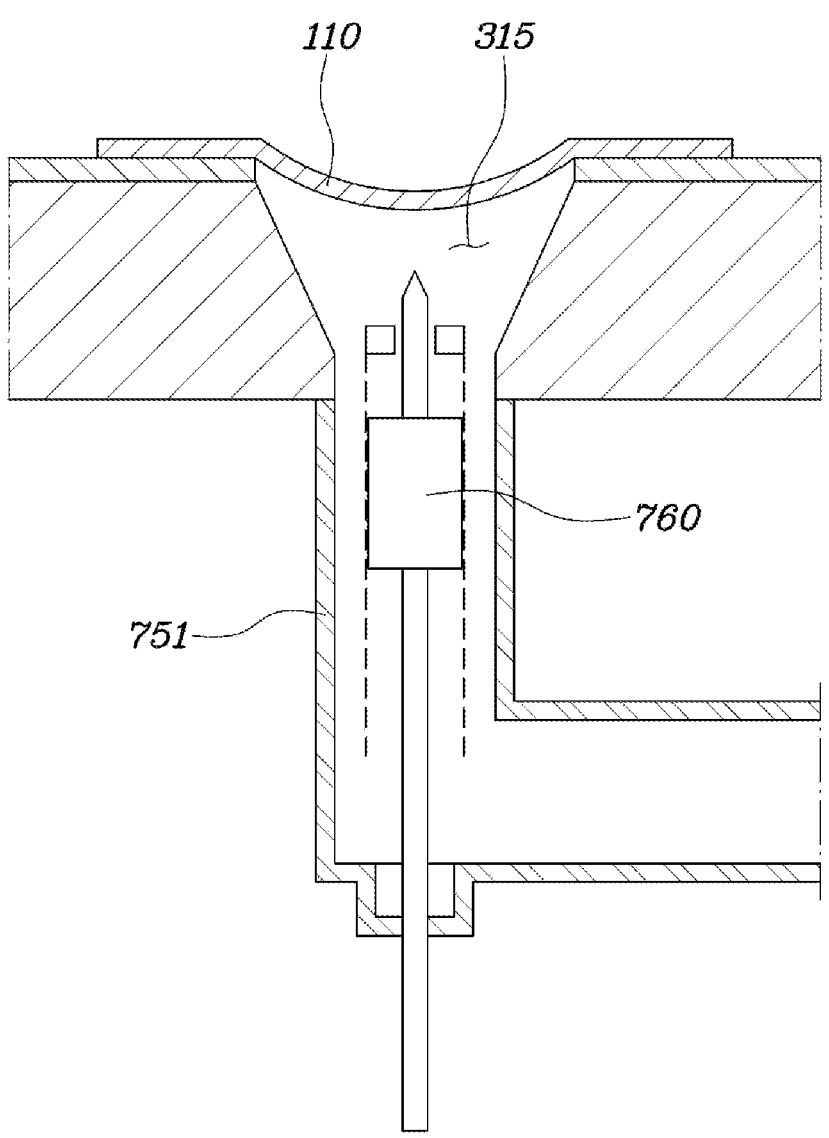

POUCH CELL VENT PRESSURE MEASUREMENT APPARATUS

CROSS REFERENCE TO RELATED APPLICATION

The present application claims under 35 U.S.C. § 119(a) the benefit of Korean Patent Application No. 10-2021-0122615 filed on Sep. 14, 2021, the entire contents of which are incorporated by reference herein for all purposes.

BACKGROUND

Technical Field

The present disclosure relates to an apparatus for measuring a vent pressure of a pouch cell of a lithium secondary battery. More specifically, present disclosure relates to an apparatus configured to form a negative pressure environment around the pouch cell to induce venting of the pouch cell through a heat fusion part of the pouch cell, and to measure the pressure within the pouch cell upon venting.

Description of the Related Art

A lithium secondary battery is a battery which stores and produces electrical energy by the intercalation and deintercalation of lithium ions at a positive electrode and a negative electrode. The lithium secondary battery has excellent storage capacity, voltage, and lifespan characteristics when used in laptops, smartphones, and electric vehicles.

The exterior, or casing, of a lithium secondary battery may configured as an angular, or prismatic type cell; a cylindrical type cell; or a pouch type cell. It is easy to change the external dimensions of the pouch type cell compared to the angular and cylindrical type cells, which typically are formed from aluminum or iron. In addition, since a pouch type cell is sealed by heat fusion, the pouch type cell is vented at a relatively low pressure when a swelling phenomenon occurs, thereby reducing risk of explosion. In addition, the pouch type cell has advantages in that it requires less space than angular and cylindrical type cells, and has a high energy density due to its light weight.

In order to design a lithium secondary battery using a pouch type cell, or pouch cell, it is necessary to measure the vent pressure of the pouch cell. In the conventional art, air at high pressure is supplied to a specific part of the pouch cell to induce the venting of the pouch cell, and the vent pressure of the pouch cell is determined by measuring the air pressure immediately before venting occurs.

However, this method may can be problematic because it can be difficult to accurately measure the vent pressure due to deformation of the pouch cell, resistance of the pouch cell to venting upon the application of pressurized air thereto, etc.

The foregoing is intended to aid in the understanding of the background of the present disclosure, and is not intended to limit the present disclosure to the related art already known to those skilled in the art.

SUMMARY

The present disclosure has been made in an effort to solve the above problems associated with the related art, and the present disclosure provides an exemplary embodiment of an apparatus for measuring a vent pressure of a pouch cell, including a pouch cell accommodating an electrode assembly therein, and formed with a heat fusion part on a side thereof; a measurement unit defining therein a space for seating the pouch cell, expanding the pouch cell by a negative pressure formed in the measurement unit, and measuring a vent pressure of the pouch cell; and a negative pressure forming unit connected to the measurement unit, and forming a negative pressure inside the measurement unit.

According to the above configuration, a method of venting the pouch cell while minimizing a change in the pressure of air inside the pouch cell and changing the pressure of air outside the pouch cell is provided. Thus, the vent pressure may be accurately measured as compared to the conventional method in which the pouch cell is vented by introducing air into the pouch cell.

In an exemplary embodiment, an apparatus for measuring a vent pressure of a pouch cell according to the present disclosure includes the pouch cell. The pouch cell is configured to accommodate an electrode assembly therein, and the pouch cell includes a heat fusion part on a side thereof. The apparatus also includes a measurement unit defining therein a space configured to seat the pouch cell. The measurement unit is configured to expand the pouch cell by a negative pressure produced in the measurement unit, and to measure a vent pressure of the pouch cell. The apparatus further includes a negative pressure forming unit connected to the measurement unit, and configured to produce a negative pressure inside the measurement unit.

In an exemplary embodiment, the apparatus further includes a seating die disposed at a lower end of the measurement unit, and the pouch cell is seated on the seating die. The apparatus also includes a contact panel disposed at an upper end in the measurement unit, and the contact panel is configured to be moved up and down and to come into contact with the seated pouch cell. The apparatus further includes a load sensor configured to measure a load generated by the pouch cell due to expansion of the pouch cell in response to a negative pressure inside the contact panel.

In an exemplary embodiment, the apparatus further includes a pressure sensitive paper disposed between the pouch cell and the contact panel and configured to measure a contact area between the contact panel and the pouch cell.

In an exemplary embodiment, the negative pressure forming unit includes a vacuum reservoir connected to the measurement unit and configured to control the negative pressure formed in the measurement unit. The negative pressure forming unit also includes a vacuum pump configured to discharge air inside the measurement unit and the vacuum reservoir. The negative pressure forming unit further includes a first valve disposed between the vacuum reservoir and the vacuum pump; and a second valve disposed between the measurement unit and the vacuum reservoir.

In an exemplary embodiment, the apparatus further includes an outside air supply unit connected to the measurement unit at a lower end of the measuring unit. The outside air supply unit is configured to form a hole in the pouch cell to supply outside air into the pouch cell and induce venting of the pouch cell when the pouch cell is not vented by the negative pressure inside the measurement unit.

In an exemplary embodiment, the outside air supply unit includes a compressor configured to compress outside air; and an outside air reservoir connected to the compressor and configured to store the compressed outside air. The outside air supply unit also includes an outside air passage configured to connect the compressor, the outside air reservoir, and the measurement unit, and through which the compressed outside air of the outside air reservoir flows. The outside air supply unit further includes a third valve disposed between the measurement unit and the outside air reservoir.

In an exemplary embodiment, the apparatus further includes a seating die disposed at a lower end of the measurement unit, and the pouch cell is seated on the seating die. A groove is formed on a side of the seating die which is in contact with the pouch cell. The outside air passage is connected to the groove, and the outside air passage and the groove are configured to supply the outside air through the hole formed in the pouch cell.

In an exemplary embodiment, the outside air passage has a branched configuration so that a first end of the outside air passage is connected to the groove and a second end of the outside air passage is connected to the inside of the measurement unit. The apparatus further includes a fourth valve formed at the second end of the outside air passage and configured to form a negative pressure in the groove to cause a portion of the pouch cell to protrude into the groove.

In an exemplary embodiment, the apparatus further includes a seating die disposed at a lower end of the measurement unit, and the pouch cell is seated on the seating die. A groove is formed on a side of the seating die which is in contact with the pouch cell, and a needle configured to form the hole in the pouch cell is disposed at a lower end of the groove.

In an exemplary embodiment, the measurement unit includes a heater configured to form a high temperature environment inside of the measurement unit; and a temperature sensor configured to measure a temperature inside of the measurement unit.

According to the apparatus for measuring a vent pressure of a pouch cell in accordance with the embodiments of the present disclosure, since a pouch cell is vented while minimizing a change in the pressure of air inside the pouch cell and changing the pressure of air outside the pouch cell, a vent pressure may be accurately measured as compared to the conventional art. When the venting of the pouch cell cannot be accomplished by the formation of a negative pressure by itself, outside air is supplied into the pouch cell to maintain a measurement unit in a vacuum state and induce the venting of the pouch cell, by which it is further possible to accurately measure a vent pressure as compared to the conventional art.

Further, using a heater and a temperature sensor disposed in the measurement unit, it is possible to measure a vent pressure depending on a temperature. Therefore, an advantage is provided in that a vent pressure may be measured under a temperature condition as may occur when the battery is driven by use.

BRIEF DESCRIPTION OF THE DRAWINGS

The above and other objects, features and advantages of the present disclosure will be more clearly understood from the following detailed description when taken in conjunction with the accompanying drawings, in which:

FIG. 1 illustrates a pouch cell vent pressure measurement apparatus according to an exemplary embodiment of the present disclosure.

FIG. 2 is a magnified view of the area designated A of FIG. 1.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium may also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure. Since the embodiments are only examples and may be implemented in various different forms by those skilled in the art to which the present disclosure pertains, the present disclosure is not limited to the embodiments described herein.

FIG. 1 illustrates a pouch cell vent pressure measurement apparatus 1000 according to an exemplary embodiment of the present disclosure. FIG. 2 is an enlarged view of, among other things, a groove 315 formed in a seating die 310 of the apparatus 1000 according to the exemplary embodiment of the present disclosure. Hereinafter, the exemplary embodiment will be described with reference to FIG. 1 and FIG. 2.

The apparatus 1000 includes a pouch cell 100 which accommodates an electrode assembly therein. The pouch cell is formed with a heat fusion part 110 on a side thereof. The apparatus 1000 also includes a measurement unit 300 which defines therein a space for seating the pouch cell 100, expands the pouch cell 100 by a negative pressure formed therein, and then measures the vent pressure of the pouch cell 100. The apparatus 1000 further includes a negative pressure forming unit 500 which is connected to the measurement unit 300, and produces a negative pressure inside the measurement unit 300.

The heat fusion part 110 refers to a portion of the pouch cell 100 which seals the pouch cell 100. More specifically, after the electrode assembly is accommodated in the pouch cell 100, a sealant inside the heat fusion part 110 is fused by applying heat to an end of the pouch cell 100, and the pouch cell is 100 is closed. The sealant then solidifies, sealing the pouch cell 100. In the case of angular type and cylindrical type cells, a separate safety vent for discharging gas to the outside is installed when a swelling phenomenon occurs. However, in the case of the pouch cell 100, the heat fusion part 110 may function as a safety vent, without the use of a separate safety vent.

The measurement unit 300 may be configured to measure the vent pressure of the pouch cell 100. The measurement unit 300 may be connected to the negative pressure forming unit 500. The negative pressure forming unit 500 performs a function of discharging air inside of the measurement unit 300 to the outside of the measurement unit 300. The air pressure inside the measurement unit 300 is gradually decreased by the negative pressure forming unit 500. Accordingly, when the air pressure inside the pouch cell 100 is larger than the air pressure inside the measurement unit 300, the pouch cell 100 gradually expands, and the pressure inside the pouch cell 100 eventually causes the pouch cell 100 to vent.

In the exemplary embodiment, the vent pressure of the pouch cell 100 may be determined by measuring the pressure within the pouch cell 100 at a point in time when venting is being induced by the elevated pressure inside the pouch cell 100. Using this method, the vent pressure may be measured more accurately in comparison to the conventional method in which outside external air is supplied into a pouch cell to induce venting of the pouch cell from the outside.

In the exemplary embodiment, the measurement of the vent pressure may be performed as follows. The seating die 310, on which the pouch cell 100 is seated, may be disposed at a lower end in the measurement unit 300. A contact panel 320 may be disposed at an upper end in the measurement unit 300. The contact panel 320, which can move up and down, is moved into contact with the seated pouch cell 100. A load sensor 330 may be provided for measuring a load generated by the pouch cell 100, which expands in response to a negative pressure provided inside the contact panel 320.

More specifically, when the pouch cell 100 is seated on the seating die 310, the contact panel 320 is lowered to a state of slight contact with the pouch cell 100, so that the contact panel 320 is not subject to an applied force from the pouch cell 100. Thereafter, as inside of the measurement unit 300 assumes a negative pressure state due to the negative pressure forming unit 500, the pouch cell 100 gradually expands and applies a load to the contact panel 320. A pressure sensor 800 provided inside the measurement unit 300 measures a lowering pressure value, and the load sensor 330 continuously measures the load applied to the contact panel 320.

When the pouch cell 100 is being vented, the load measured by the load sensor 330 starts to decrease instantaneously. The time point at which this occurs is regarded as the time point at which the venting of the pouch cell 100 occurs, and the measured load is at its highest at this point. It is preferable that a plurality of load sensors 330, e.g., at least four load sensors spaced apart from each other, are provided for measuring the load generated by the pouch cell 100.

A pressure sensitive paper 200 for measuring a contact area between the contact panel 320 and the pouch cell 100 may be provided between the pouch cell 100 and the contact panel 320. Since the pressure sensitive paper 200 changes color in an area or areas in which pressure is applied thereto, the use of the pressure sensitive paper 200 between the pouch cell 100 and the contact panel 320 permits the area of the load generated by the pouch cell 100 on the contact panel 320 to be measured.

Accordingly, the vent pressure of the pouch cell 100 may be determined by dividing the combined maximum pressure values obtained from the load sensors 330 by the discolored area of the pressure sensitive paper 200.

The venting of the pouch cell 100 occurs when the heat fusion part 110 is broken. When the heat fusion part 110 reaches a pressure at which it will break, it nevertheless takes additional time for the heat fusion part 110 to open. Therefore, a pressure inside the measurement unit 300 is lowered in a stepwise manner, since it is necessary to maintain a pressure for a certain time after a target pressure is reached to allow time for the heat fusion part to open 110.

In order to perform the above-described function, the negative pressure forming unit 500 includes a vacuum reservoir 510 which is connected to the measurement unit 300 and controls a negative pressure formed in the measurement unit 300; a vacuum pump 520 which discharges air inside the measurement unit 300 and the vacuum reservoir 510; a first valve 530 which is disposed between the vacuum reservoir 510 and the vacuum pump 520; and a second valve 540 which is disposed between the measurement unit 300 and the vacuum reservoir 510.

The vacuum reservoir 510 may be configured to lower the air pressure inside the measurement unit 300, and to quickly and precisely adjust the negative pressure inside the measurement unit 300. The vacuum reservoir 510 is maintained in a vacuum state, and a pressure inside the measurement unit 300 may be reduced by adjusting an opening and closing amount of the second valve 540. A pressure sensor 800 may be provided inside the vacuum reservoir 510, to measure the pressure therein and determine whether a vacuum state has been reached.

In further detail, the vacuum pump 520 is actuated while the first valve 530 and the second valve 540 are closed. A vacuum state then is created in the vacuum reservoir 510 by the opening of the first valve 530. The pressure inside the measurement unit 300 then is lowered by a predetermined target amount by adjusting the degree to which the second valve 540, which is provided between the vacuum reservoir 510 and the measurement unit 300, is opened.

When the measurement unit 300 and the vacuum pump 520 are directly connected, it is difficult to precisely control a pressure inside the measurement unit 300. Thus, by providing the vacuum reservoir 510, the pressure inside the measurement unit 300 can be controlled precisely through the vacuum reservoir 510.

When the heat fusion of the pouch cell 100 is strongly made or when air inside the pouch cell 100 is absolutely insufficient to create a vacuum state by which the heat fusion part 110 can be broken, the heat fusion part 110 may remain unbroken. In this case, the vent pressure may be measured by supplying outside air into the pouch cell 100 to induce the breakage of the heat fusion part 110 of the pouch cell 100.

More specifically, since the degree by which the air pressure in the pouch cell 100 is lowered may be determined through the pressure sensor 800 provided inside the measurement unit 300, when the venting of the pouch cell 100 is not made even though the pressure is lowered to a certain level, the actuation of the negative pressure forming unit 500 may be stopped.

An outside air supply unit 700 may be connected to the lower end of the measurement unit 300. The outside air supply unit 700 may be configured to form a hole in the seated pouch cell 100 to supply outside air into the pouch cell 100 and induce the venting of the pouch cell 100 when the heat fusion part 110 cannot be broken as discussed above. The hole in the pouch cell 100 may be formed through a needle 760. Referring to FIG. 2, the needle 760 may be provided in the groove 315 which is formed on a side of the seating die 310 where the pouch cell 100 and the seating die 310 are in contact.

The outside air supply unit 700 includes a compressor 720 configured to compress outside, or ambient, air; and an outside air reservoir 710 which is connected to the compressor 720 and stores the compressed outside air. The outside air supply unit 700 also includes an outside air passage 750 which connects the compressor 720, the outside air reservoir 710, and the measurement unit 300. The compressed outside air from the outside air reservoir 710 flows through the outside air passage 750. The outside air supply unit 700 further includes a third valve 730 provided between the measurement unit 300 and the outside air reservoir 710. The outside air may be stored in the outside air reservoir 710 after being compressed to a high pressure by the compressor 720. The outside air introduced through the hole of the pouch cell 100 may be adjusted by adjusting the degree to which the third valve 730, which is provided between the outside air reservoir 710 and the measurement unit 300, is opened. The supply of the outside air also needs to be adjusted so that an excessive amount of outside air is not introduced at once. Therefore, the outside air is not directly supplied into the pouch cell 100 through the compressor 720, but is gradually supplied by way of the outside air reservoir 710 and the third valve 730.

A pressure sensor 800 for measuring the pressure within the outside air reservoir 710 may be provided in the outside air reservoir 710.

The compressed outside air may be introduced through the hole of the pouch cell 100 as follows. The seating die 310 on which the pouch cell 100 is seated is disposed at the lower end of the measurement unit 300, the groove 315 is formed on the side of the seating die 310 which is in contact with the pouch cell 100, and the outside air passage 750 is connected to the groove 315, so that the compressed outside air may be supplied through the hole formed in the pouch cell 100 by way of the outside air passage 750 and the groove 315.

At this time, since the inside of the measurement unit 300 is continuously maintained at a negative pressure state, the pouch cell 100 continues to expand due to the outside air being supplied thereto, which eventually causes the heat fusion part 110 to break. The pouch cell 100 then can be vented by way of the broken thermal fusion part 100.

When the pouch cell 100 is not vented even though a negative pressure is formed in the measurement unit 300 by the negative pressure forming unit 500, the formation of the hole in the pouch cell 100 may be facilitated by a fourth valve 740 provided in the outside air passage 750.

More specifically, the outside air passage 750 is branched such that one end 751 of the outside air passage 750 is connected to the groove 315 formed on the one side of the seating die 310, and the other end 752 of the outside air passage 750 is connected to the inside of the measurement unit 300. The fourth valve 740 may be provided at the end of the other end 752 of the outside air passage 750.

The fourth valve 740 is normally open. Accordingly, when the negative pressure forming unit 500 is actuated, the pouch cell 100, which is in contact with the groove 315 of the seating die 310, expands downward. When the pouch cell 100 is not vented even though a certain level of a negative pressure is formed in the measurement unit 300, the fourth valve 740 is closed, and the hole is formed in the pouch cell 100 through the needle 760. At this point, if the fourth valve 740 is not closed, air inside the pouch cell 100 may be discharged through the hole by the negative pressure formed in the measurement unit 300, and electrolyte from the battery may leak through the hole. Thus, the fourth valve 740 needs to be essentially closed at this point.

A lithium secondary battery has excellent storage capacity, voltage, and lifespan characteristics to be used as batteries for laptops, smartphones, and electric vehicles. Because the operating temperature of the lithium secondary battery may be different depending on the environment in which the lithium secondary battery is used, it is necessaiy to consider a vent pressure dependent on operating temperature when designing the lithium secondary battery. In particular, since the lithium secondary battery can experience decomposition of its electrolyte due to temperature rise caused by overvoltage and other factors, and a swelling phenomenon resulting from the temperature rise, it is necessary to measure the vent pressure in a high temperature environment. Therefore, in order to measure a vent pressure in a high temperature environment, a heater 340 for forming a high temperature environment the inside of the measurement unit 300 may be provided in the measurement unit 300. A temperature sensor 350 for measuring the temperature inside of the measurement unit 300 also may be provided.

Through the above configuration, the apparatus 1000 may measure the vent pressure of the pouch cell 100 more accurately than conventional techniques. When the venting of a pouch cell 100 is not or cannot be made only by the formation of a negative pressure, the vent pressure of the pouch cell may be measured by supplying outside air into the pouch cell and inducing the venting of the pouch cell while maintaining the measurement unit in a vacuum state.

While the specific exemplary embodiment of the present disclosure has been illustrated and described, it will be apparent to those skilled in the art that the present disclosure may be variously improved and changed without departing from the technical spirit of the present disclosure provided by the appended claims.

What is claimed is:

1. An apparatus for measuring a vent pressure of a pouch cell, comprising:

the pouch cell, wherein the pouch cell is configured to accommodate an electrode assembly therein, and the pouch cell comprises a heat fusion part on a side thereof;

a measurement chamber defining therein a space configured to seat the pouch cell, wherein the measurement chamber is configured to expand the pouch cell by a negative pressure produced in the measurement chamber, and to measure a vent pressure of the pouch cell; and a negative pressure forming device connected to the measurement chamber, and configured to produce the negative pressure inside the measurement chamber; and an outside air supply device connected to the measurement chamber at a lower end of the measurement chamber, wherein the outside air supply device is configured to form a hole in the pouch cell to supply outside air into the pouch cell and induce venting of the pouch cell when the pouch cell is not vented by the negative pressure inside the measurement chamber.

2. The apparatus according to claim 1, further comprising:

a seating die disposed at a lower end of the measurement chamber, wherein the pouch cell is seated on the seating die;

a contact panel disposed at an upper end in the measurement chamber, wherein the contact panel is configured to be moved up and down and to come into contact with the seated pouch cell; and a load sensor configured to measure a load generated by the pouch cell due to expansion of the pouch cell in response to a negative pressure inside the contact panel.

3. The apparatus according to claim 2, further comprising a pressure sensitive paper disposed between the pouch cell and the contact panel and configured to measure a contact area between the contact panel and the pouch cell.

4. The apparatus according to claim 1, wherein the negative pressure forming device comprises:

a vacuum reservoir connected to the measurement chamber and configured to control the negative pressure formed in the measurement chamber;

a vacuum pump configured to discharge air inside the measurement chamber and the vacuum reservoir;

a first valve disposed between the vacuum reservoir and the vacuum pump; and a second valve disposed between the measurement chamber and the vacuum reservoir.

5. The apparatus according to claim 1, wherein the outside air supply device comprises:

a compressor configured to compress outside air;

an outside air reservoir connected to the compressor and configured to store the compressed outside air;

an outside air passage configured to connect the compressor, the outside air reservoir, and the measurement chamber, and through which the compressed outside air of the outside air reservoir flows; and a third valve disposed between the measurement chamber and the outside air reservoir.

6. The apparatus according to claim 5, further comprising a seating die disposed at a lower end of the measurement chamber, wherein:

the pouch cell is seated on the seating die;

a groove is formed on a side of the seating die which is in contact with the pouch cell;

the outside air passage is connected to the groove; and the outside air passage and the groove are configured to supply the outside air through the hole formed in the pouch cell.

7. The apparatus according to claim 6, wherein:

the outside air passage has a branched configuration so that a first end of the outside air passage is connected to the groove and a second end of the outside air passage is connected to the inside of the measurement chamber; and the apparatus further comprises a fourth valve formed at the second end of the outside air passage and configured to form a negative pressure in the groove to cause a portion of the pouch cell to protrude into the groove.

8. The apparatus according to claim 1, further comprising a seating die disposed at a lower end of the measurement chamber, wherein:

the pouch cell is seated on the seating die;

a groove is formed on a side of the seating die which is in contact with the pouch cell; and a needle configured to form the hole in the pouch cell is disposed at a lower end of the groove.

9. The apparatus according to claim 1, wherein the measurement chamber comprises:

a heater configured to create a high temperature environment inside of the measurement chamber; and a temperature sensor configured to measure a temperature inside of the measurement chamber.

* * * * *